June 19, 1945. T. BROWN 2,378,615
TRACTOR
Filed Sept. 17, 1942 5 Sheets-Sheet 2

FIG. 2

INVENTOR
THEOPHILUS BROWN
BY

ATTORNEYS

June 19, 1945.  T. BROWN  2,378,615
TRACTOR
Filed Sept. 17, 1942   5 Sheets-Sheet 4

INVENTOR
THEOPHILUS BROWN
BY
ATTORNEYS

Patented June 19, 1945

2,378,615

UNITED STATES PATENT OFFICE 2,378,615

TRACTOR

Theophilus Brown, Moline, Ill., assignor to Deere & Company, Moline, Ill., a corporation of Illinois Application September 17, 1942, Serial No. 458,712

18 Claims. (Cl. 180—1)

The present invention relates generally to tractors and has for its principal object the provision of a novel and improved tractor for general farm use such as cultivating, plowing, and propelling various types of implements and wagons.

Heretofore, the conventional tractor design has been based on tractors adapted to cultivate two or more rows of crops such as corn and the like. As is well known to those skilled in the art, this type of tractor usually takes the form of a narrow longitudinally extending, centrally disposed body supported on a pair of laterally spaced rear traction wheels and a pair of closely spaced dirigible front wheels, otherwise known as the tricycle type tractor. This type of tractor is also known as a general purpose tractor for the reason that it is not only adapted to draw trailing implements behind the tractor, but also can support a cultivating implement mounted directly on each side of the tractor near the forward end thereof.

More recently, there has arisen a demand for smaller, less expensive tractors for use on small farms, which is especially designed for cultivating a single row of crops. At first, this type of tractor was generally similar to the two-row general purpose tractor, except that the front wheels were laterally spaced in alignment with the rear wheels. Cultivating tools were mounted beneath the tractor on opposite sides of the center line and were adapted to cultivate a single row of crops beneath the center line of the tractor. A disadvantage of this design, however, was that an operator sitting in the operator's seat behind the tractor engine and on the center line of the tractor, was required to lean to one side in order to obtain a view of the row of crops and the action of the cultivating tools thereon.

The next step in the development of the one-row tractor was to offset the tractor engine to one side of the center line of the tractor, while the seat was offset to the opposite side of the center line, thus enabling the operator to obtain a clearer view of the row of crops by looking forwardly under the tractor engine from his offset position.

According to the present invention, the operator's seat is placed at the forward end of the tractor frame and the engine is disposed at the rear end of the frame, thereby affording the tractor operator a clear and unobstructed view of the row of plants directly in front of the tractor. While it is realized that it is not broadly new to arrange the seat and motor in this fashion, it is an object of the present invention to so arrange and construct the parts of the tractor engine that the operator can obtain a clear and unobstructed view of a tillage implement such as a plow, mounted on the tractor and trailing behind the latter between the two traction wheels, in addition to an unobstructed view of the cultivator tools in front of the tractor.

A further object relates to the provision of a one-row tractor in which the seat is behind the engine, but the latter is so arranged that the operator can obtain a clear line of vision over the top of the radiator to the ground between the tractor front wheels.

Still another object of this invention has to do with the provision of a novel and improved front truck for the tractor, of such construction and arrangement as to provide a clear and unobstructed space between the two front dirigible wheels for mounting cultivating tools and other implements, providing a clear view thereof from the operator's seat, and by virtue of the position of such tools adjacent the front wheels of the tractor, the direction of travel of the tools can be quickly and easily changed by steering of the tractor, such as when cultivating corn and other crops. A related object has to do with the provision of means for mounting cultivating tools on the foretruck of the tractor, the latter being rockable about a longitudinally extending axis, thereby providing for movement of the tools with the foretruck when traveling over uneven ground.

These and other objects and advantages of my invention will be apparent to those skilled in the art after a consideration of the following description, in which reference is had to the drawings appended hereto, in which.

Figures 1, 3, 4:
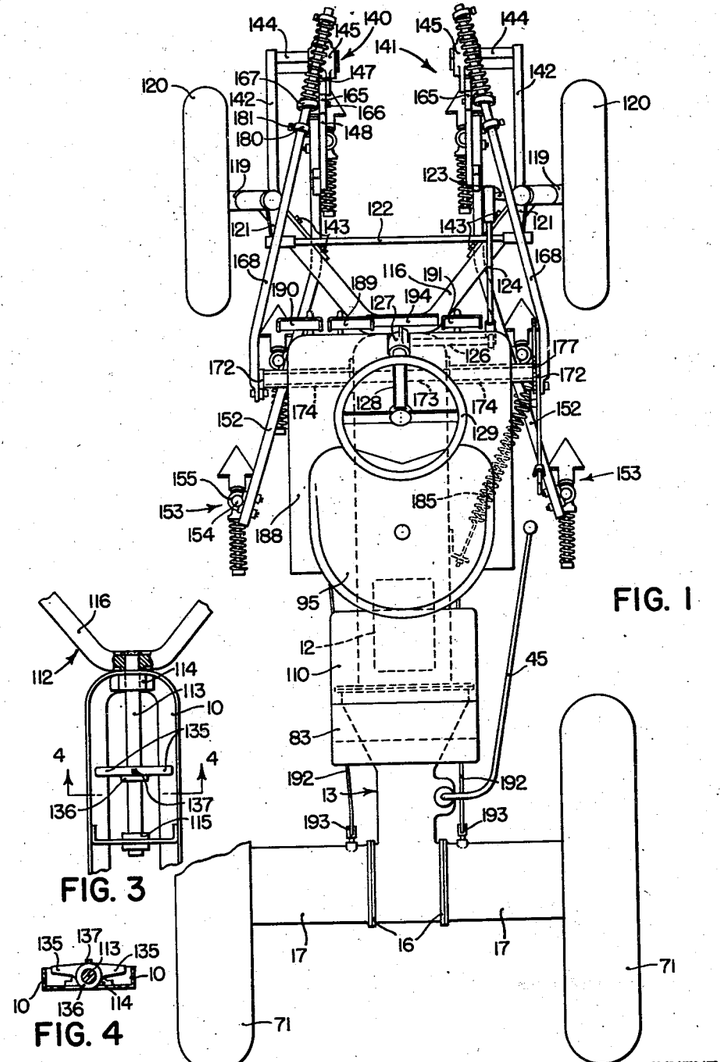
Figure 1 is a plan view of a tractor with cultivator attachment, embodying the principles of the present invention.
Figure 3 is a plan view of the foreward end of the tractor frame, showing in detail the connection of the foretruck to the forward end of the frame.
Figure 4 is a sectional elevational view through the tractor frame, taken along a line 4—4 in Figure 3.
Figure 2:
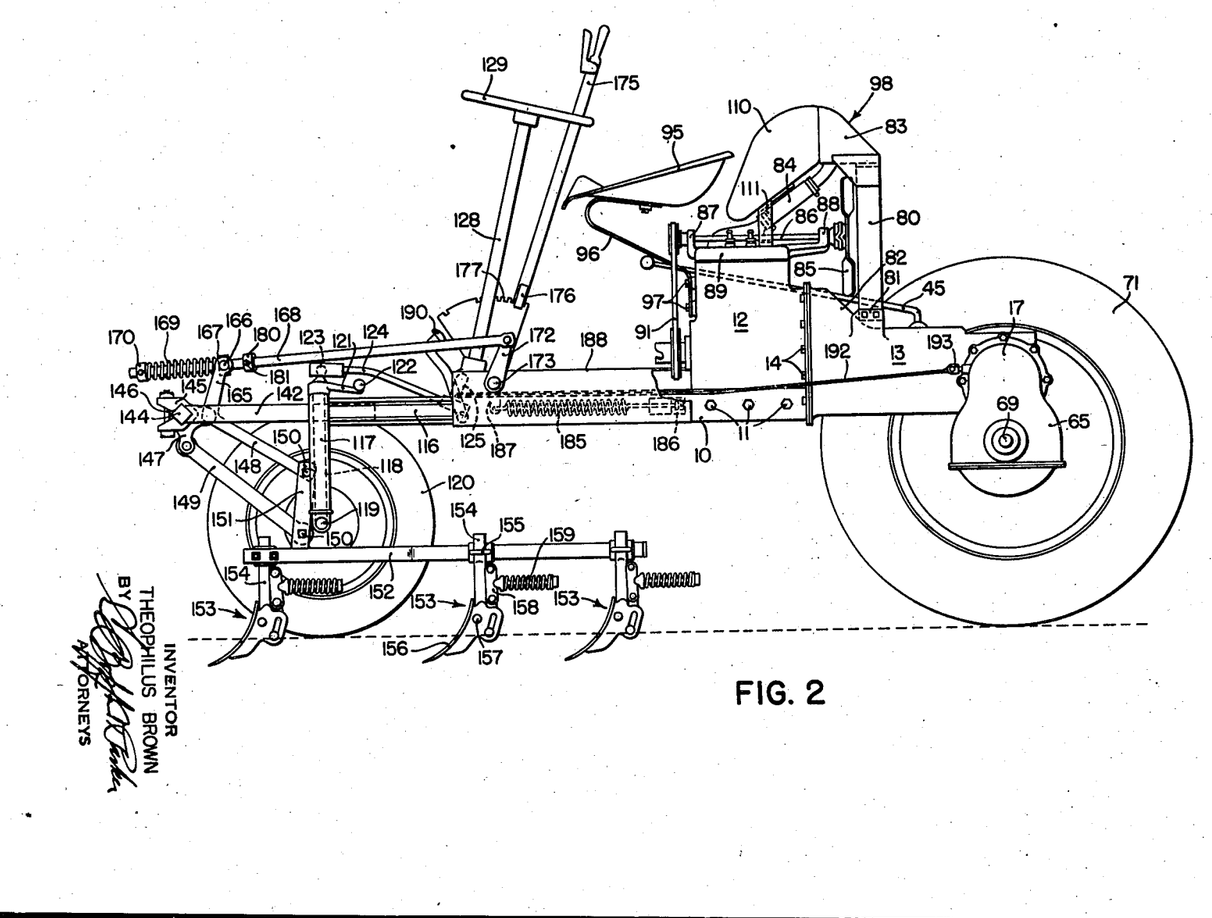
Figure 2 is a side elevational view of the tractor cultivator.
Figure 5:
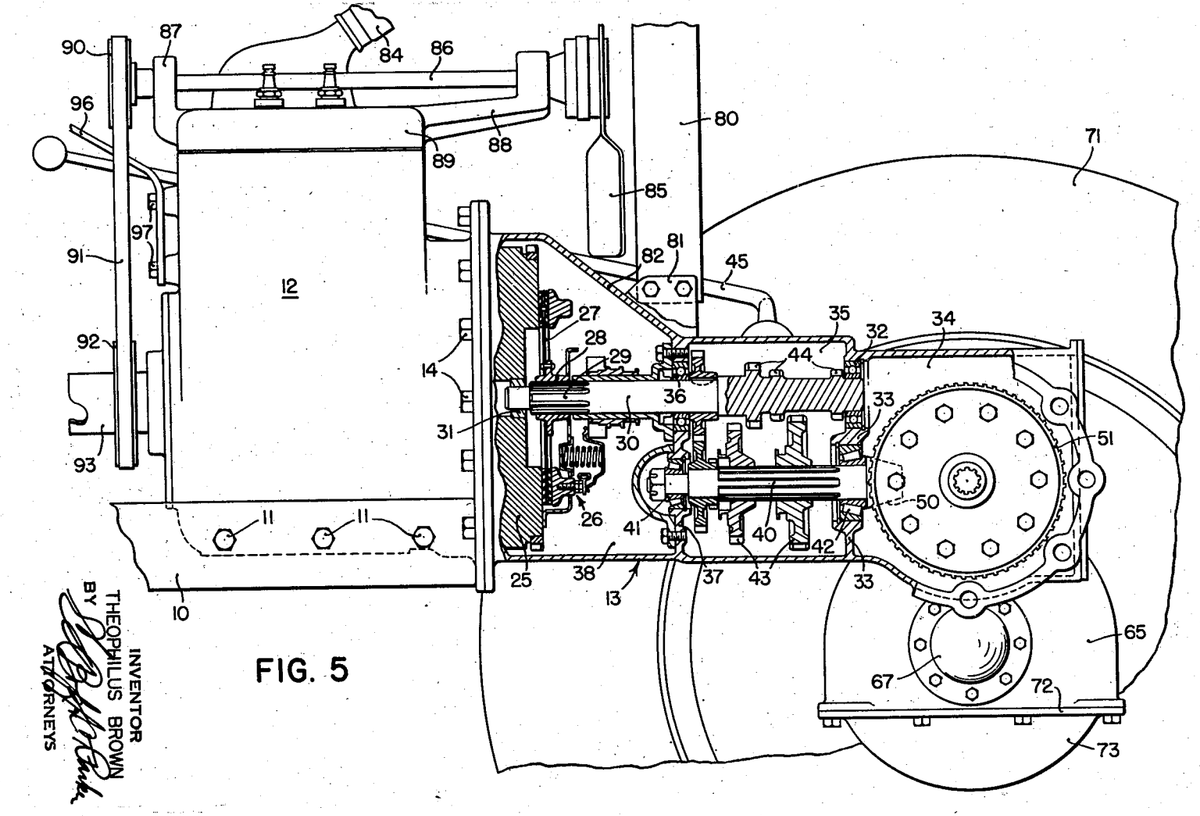
Figure 5 is a fragmentary elevational view, drawn to an enlarged scale, showing the motor or engine of the tractor, and its connections with the transmission and rear axle housings, a portion of the latter being broken away and shown in section.

Referring now to the drawings, the tractor frame comprises a pair of laterally spaced frame members formed by a structural angle bar 10 bent into a U-shape as best shown in Figure 3, the ends of the bar 10 being secured by bolts 11 to the lower portion of an internal combustion engine 12, and a unitary transmission housing 13 rigidly bolted to the cylinder block of the engine 12 by means of bolts 14, the frame bar 10, engine 12, and housing 13 constituting a narrow longitudinally extending tractor body.

The rear end of the transmission housing 13 is provided with aligned openings 15 in the opposite side walls thereof, respectively, and having annular flanges 16 about the openings. A pair of laterally extending tubular rear axle housings 17 are provided with annular flanges 18 which lie in abutment with the flanges 16 on the transmission housing and are fixed thereto by bolts 19.

Figure 6:
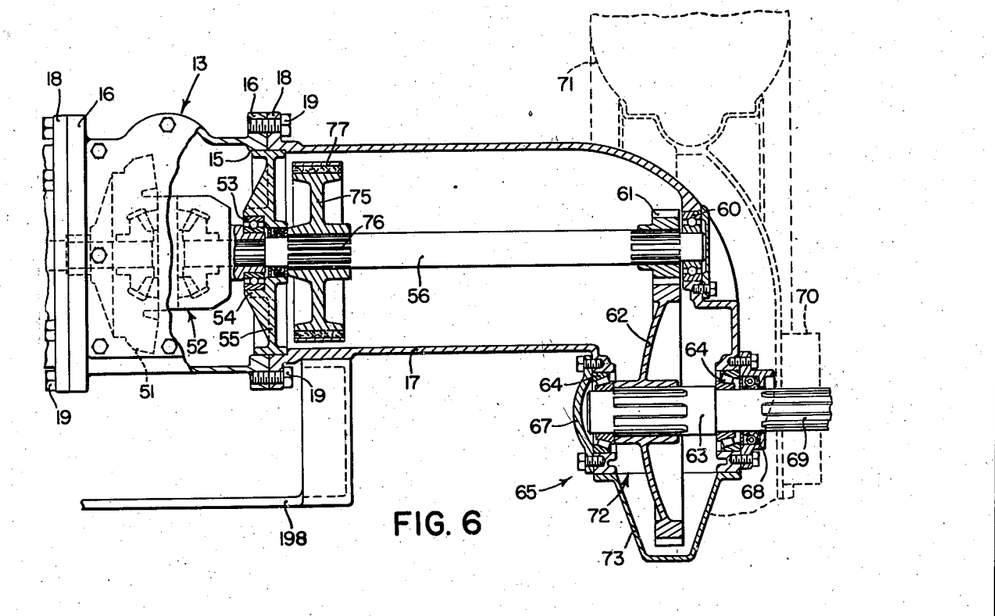
Figure 6 is a rear elevational view, partly in section, of one side of the rear axle housing.

The tractor engine 12 is provided with a flywheel 25 on the engine and is driven thereby. The flywheel 25 is disposed within one of three compartments in the unitary transmission housing 13. This compartment also houses the clutch mechanism 26 of the tractor, which mechanism can be of any conventional design well-known to those skilled in the art. The clutch mechanism 26 includes a clutch plate member 27 having a hub 28, which is mounted on a splined portion 29 of a propeller shaft 30. The shaft 30 is supported at its forward end in a bearing 31, located in a central recess in the flywheel 25, while the rear end of the propeller shaft 30 is journaled in a bearing 32 disposed within an aperture in a partition 33, which divides the transmission housing 13 into a rear differential compartment 34 and an intermediate or change gear compartment 35. The intermediate portion of the propeller shaft 30 is carried in a bearing 36, which is carried in a partition 37 dividing the clutch compartment 38 from the change gear compartment 35. A splined shaft 40 is supported in bearings 41, 42 at opposite ends, respectively, mounted in the partitions 37, 33, respectively. The splined shaft 40 is provided with a plurality of shiftable gears 43 which are adapted to shift into mesh with gears 44 on the propeller shaft 30 and are connected by suitable forks (not shown) to a gear shift lever 45, mounted on top of the change gear compartment 35 of the transmission housing 13, and extending forwardly to a position convenient for operation by the tractor operator, as will be evident from later description. The splined shaft 40 extends rearwardly through the partition 33 into the differential compartment 34 and drives a bevel pinion 50, which is in mesh with a bevel gear 51 for driving a more or less conventional differential mechanism indicated generally by reference numeral 52. The differential mechanism 52 is carried in bearings 53 mounted within a hub 54 of a disk 55, which is removably disposed within the flanged opening 15 and is secured therein by a suitable shoulder within the tubular axle housing 17, as best shown in Figure 6. An axle 56 is disposed within the axle housing 17 and is splined at its inner end at 57 for connection with the differential mechanism. The outer end of the axle 56 is mounted in a bearing 60 in the end of the housing 17 and carries a drive pinion 61 adjacent the outer end of the axle. A final drive gear 62 is disposed in mesh with the pinion 61 and is mounted on a splined axle 63, spaced below the drive axle 56 and carried in laterally spaced bearings 64 mounted within suitable apertures in a pair of laterally spaced walls, defining a depending portion 65 of the axle housing 17. The inner bearing 64 is protected by a cap 67, securely bolted over the bearing opening, while the outer bearing 64 is protected by an oil seal 68. The stub axle 63 extends through the oil seal 68 and the outer end is splined at 69 to receive a hub 70 of a rear traction wheel 71. The lower end of the depending housing portion 65 is open along a generally horizontal plane as indicated at 72, to receive the gear 62 during installation thereof, as is known to those skilled in the art. A bottom pan 73 is provided to close this opening and protect the gear 62.

Each of the drive shafts 56 is provided with a brake drum 75 mounted on a splined portion 76 of the shaft 56. A brake band 77 is wrapped around the drum 75 and is operated by a suitable pedal at the operator's station as will be later described.

The engine 12 is cooled by means of a water cooling system including a radiator 80 mounted on a pair of laterally spaced lugs 81 on top of the unitary transmission housing 13. The radiator 80 is disposed adjacent the rear end of the forward clutch compartment 38, the latter being provided with a rearwardly and downwardly inclined top wall 82 in order to position the radiator 80 as low as possible. A water compartment 83 is provided at the top of the radiator 80 and is connected with the engine through a suitable hose connection 84. The lower end of the radiator is, of course, connected with the lower part of the engine by another suitable hose connection (not shown).

The radiator 80 is cooled by a fan 85 disposed directly ahead of the radiator on the rear end of a drive shaft 86 which is journaled in a pair of front and rear brackets 87, 88, respectively. The brackets are rigidly fixed to the front and rear ends of the cylinder head 89. A belt pulley 90 is fixed to the forward end of the fan drive shaft 86 and is connected by a suitable V-belt 91 or the equivalent, with a drive sheave 92 mounted on the forward end of the crank shaft 93.

Figure 7:
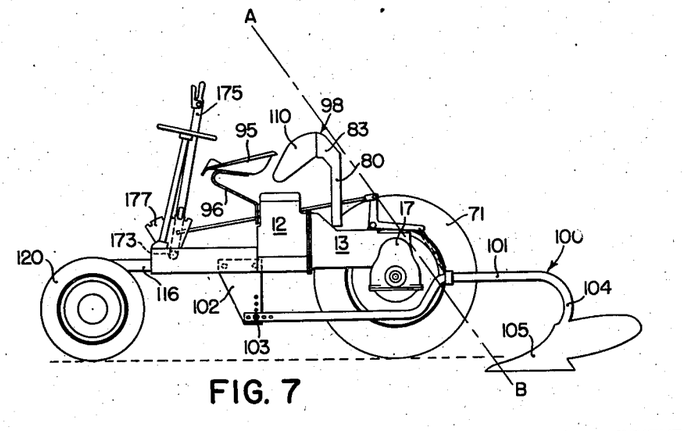
Figure 7 is a side elevational view drawn to a small scale showing the tractor with an integral plow mounted thereon, to illustrate the line of vision of the latter from the tractor seat.

An operator's seat 95 is carried on a supporting bracket 96 which is secured by supporting bolts 97 on the front of the engine block. The seat 95 is positioned above the forward end of the engine 12 and is high enough so that an operator seated in the seat 95 can look rearwardly over his shoulder and obtain a clear and unobstructed view of the ground directly behind the rear axle housings 17. The rear of the water compartment 83 is inclined downwardly, as indicated at 98, beneath a plane of vision extending from the eye of an operator seated on the seat 95, downwardly and rearwardly over the top of the rear axle housing 17, as indicated by a line A—B in Figure 7. This provides adequate vision of a tillage implement mounted on and drawn behind the tractor between the rear traction wheels 71. Figure 7 shows a plow 100 comprising a longitudinally extending beam 101 pivotally connected by a bolt 103 to a bracket 102 mounted on the tractor frame and extending rearwardly beneath the rear axle housing and having a downwardly and forwardly curving shank 104, to which is secured a plow bottom 105 in a manner known to those skilled in the art.

A fuel tank 110 is disposed between the operator's seat 95 and the water compartment 83. The forward end of the tank is supported on brackets 111 carried on the cylinder head and the rear wall of the tank lies against the forward wall of the water compartment 83 and is fixed thereto by any suitable supporting means. The front of the fuel tank is inclined downwardly and forwardly beneath the rear of the seat 95 to provide clearance for the latter.

The forward end of the tractor frame 10 is carried on a Y-shaped foretruck, indicated in its entirety by reference numeral 112. The foretruck 112 comprises a longitudinally extending cylindrical bearing portion 113, journaled at its front and rear ends in bearings 114, 115 mounted on the frame 10 and providing for rocking movement of the bearing portion 113 about a generally horizontal, centrally disposed axis. A U-shaped axle beam member 116 is rigidly fixed as by welding, to the front end of the bearing portion 113, which extends forwardly beyond the tractor frame 10, as best shown in Figure 3. The U-shaped axle member 116 consists of a structural beam of I-section, the ends of which are bent to provide a pair of forwardly diverging arms. At the forward end of each arm, a vertically disposed sleeve 117 is rigidly fixed, as by welding, and within which sleeve is disposed a vertical spindle 118, the lower end of which is provided with an outwardly extending axle 119. A pair of supporting wheels 120 are journaled on the axles 119, respectively, substantially in fore and aft alignment with the rear traction wheels 71. The spindles 118 extend upwardly beyond the tops of the sleeves 117 and are provided with a pair of crank arms 121, which extend rearwardly therefrom. The crank arms 121 are interconnected by a transversely disposed tie rod 122, and one of the spindles, the one on the right side of the tractor as viewed in Figure 1, is provided with an extra crank arm 123 extending laterally inwardly, and is pivotally connected with a rearwardly extending steering link 124, the latter being connected at its rear end to a crank arm 125 on a rockshaft 126, which extends laterally inwardly to a conventional worm gear mechanism 127 on the lower end of a steering column 128, which is mounted on the forward end of the tractor frame in front of the seat 95. A steering wheel 129 is fixed to the upper end of the steering column in convenient position to the operator. If desired, the steering column 128 can be of the angularly adjustable type to provide fore and aft adjustment of the wheel 129 relative to the seat 95.

It is evident that the above described foretruck, by virtue of its pivotal connection with the tractor frame, is sufficiently flexible to follow the uneven contour of the ground and to distribute the weight of the tractor upon the two front wheels. The amount of rocking movement of the foretruck, however, is limited by means of a pair of stop arms 135, mounted rigidly on a hub member 136, embracing the bearing portion 113 of the Y-shaped truck member 112. The hub 136 is fixed to the central bearing portion 113 by means of a set screw 137, as best shown in Figures 3 and 4. The stop arms 135 extend laterally over the lower flanges of the tractor frame 10, but are spaced above the latter to provide a limited amount of rocking movement about the fore and aft extending axis of the central bearing portion 113.

The widely diverging supporting arm portions of the foretruck 116 provide a clear space therebetween, which is within the direct line of vision of the operator when seated on the operator's seat 95. This space is available for cultivating tools or other implements, which, when so placed, are not only in a convenient position for observation from the operator's position, but can be accurately controlled by steering the dirigible front wheels 120 of the tractor.

The drawings show a pair of cultivator rigs mounted on the forwardly diverging arms of the foretruck 116, respectively, to position the cultivating tools on opposite sides of the fore and aft extending center line of the tractor, for the purpose of cultivating a row of crops over which the tractor straddles to place the plants beneath the tractor center line.

Each of the two cultivator assemblies 140, 141, comprises a supporting beam 142, rigidly fixed by means of removable bolts 143 against the inner sides of the arms 116, and extending forwardly from the forward ends of the arms and terminating ahead of the dirigible front wheels 120. A stub arm 144 is rigidly fixed, as by welding, to the front end of the beam 142 and extends laterally inwardly therefrom and terminates at a point outwardly from the center line of the tractor in order to provide a clear space for the plants in the row to be cultivated. A cultivator supporting bracket 145 is rigidly clamped by means of a bolt 146 to the arm 144, the latter being of square cross section. Lateral adjustment of the bracket 145 is obtainable by loosening the bolt 146 and sliding the bracket laterally along the square arm 144.

The bracket is provided with a pair of lugs 147, formed on the rear side thereof, to which are swingably connected a pair of draft links 148, 149, spaced vertically and extending rearwardly therefrom. The rear ends of the links 148 and 149 are pivotally connected by means of bolts 150 to a generally vertical standard 151, which is rigidly fixed as by welding to a generally horizontal rig beam 152. A plurality of cultivating tools 153 is mounted on each of the rig beams 152, in spaced relation therealong. Each of the tools comprises a vertical shank 154, secured by a U-bolt clamp 155 to the rig beam 152 and extending downwardly therefrom. At the lower end of the shank 154, a cultivator shovel 156 is pivotally connected by a transverse bolt 157, permitting the shovel 156 to swing rearwardly when it encounters an obstruction in the field during operation. Normally, the shovel is held in operating position by means of a pair of toggle links 158, which are urged into locking position by a spring 159. Inasmuch as the details of the cultivator tools are not considered a part of this invention, a detailed description thereof is not deemed necessary.

Each of the cultivator rigs is raised and lowered through a crank arm 165, fixed to the upper link 148 and extending upwardly therefrom. The upper end of the crank arm 165 is pivotally connected by a trunnion 166 to a collar 167 embracing a control rod 168. A compression spring 169 embraces the control rod 168 ahead of the collar 167 and bears against a collar 170 fixed to the forward end of the control rod. The two rods 168 for the two cultivator assemblies 140, 141, extend rearwardly in diverging relation and are pivotally connected to a pair of upwardly extending arms 172, which are rigidly fixed to a transverse rockshaft 173, the latter being journaled in a pair of supporting sleeves 174 fixed to the tractor frame 10 and extending laterally outwardly therefrom. One of the arms 172 is extended upwardly to serve as a handle 175, which is secured in adjusted position by means of a conventional latch mechanism 176, which engages a notched sector 177, fixed to the supporting sleeve 174 and carried thereby. By pulling the lever 175 rearwardly, the spring 169 is compressed, forcing the cultivator shovels downwardly into the ground, but allowing them to float against the action of the spring 169. When the lever 175 is swung forwardly, a collar 180 on the rod 168 engages the collar 167 and swings the arm 165 forwardly, thereby raising the links 148, 149 and the cultivator rig. The collar 180 is adjustably fixed to the rod 168 at any desired position thereon by means of a set screw 181.

Thus it is evident, that each of the cultivator rigs is permitted a limited amount of vertical floating movement independent of the other, while both rigs are mounted on the foretruck and therefore swing with the latter about the fore and aft extending axis of the central bearing portion 113. There is sufficient looseness in the connections between the rockshaft 173 and the arms 165 to provide for a limited amount of rocking movement of the foretruck. The weight of the cultivator rigs is counterbalanced by means of a spring 185 connected between a lug 186 on the side of the tractor frame and an arm 187 on the rockshaft 173.

During operation, the operator sits on the seat 95 or stands on the platform 188, which is supported on the frame members 10. A clutch pedal 189 is disposed at the forward edge of the platform 188 and is connected by suitable means (not shown) to the clutch mechanism 26 in the usual manner. A pair of brake pedals 190, 191, are mounted at opposite sides of the clutch pedal 189 and are connected by brake rods 192 to the brake band actuating members 193. Thus, either of the brakes can be applied separately for purposes well-known to those skilled in the art. The clutch pedal 189 has a lateral extension 194 adjacent the brake pedal 191 on the right side of the tractor, to permit the clutch to be released by the right foot of the operator when he is applying the brake pedal 190 with his left foot.

Figure 8:
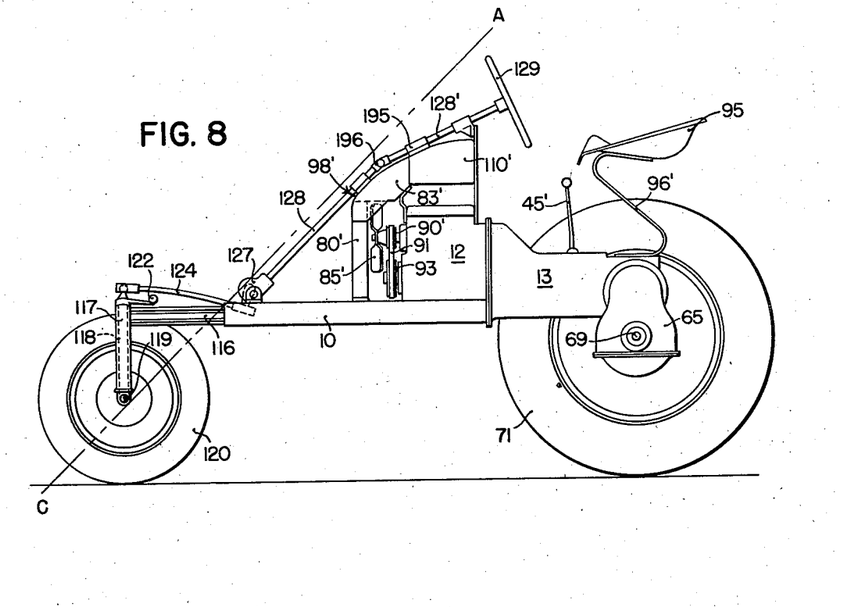
Figure 8 is a side elevational view of a modified form of the present invention.
Figure 9:
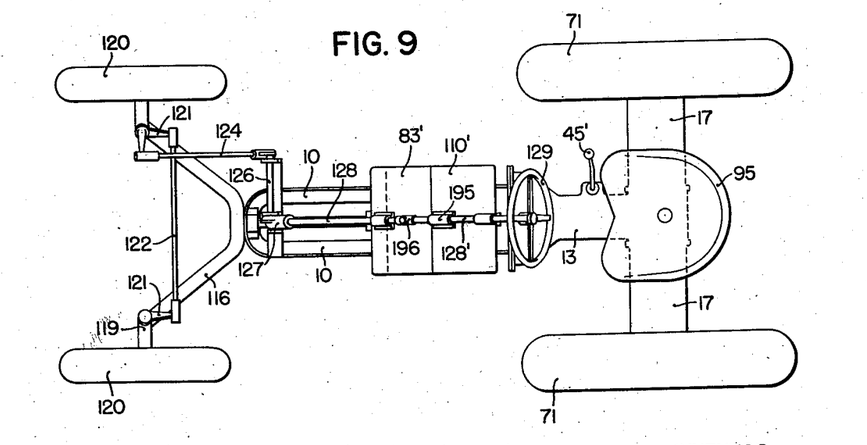
Figure 9 is a plan view of the modified form.

Referring now more particularly to Figures 8 and 9, the chassis, including frame 10, engine 12, transmission housing 13, and front and rear wheel mounting means, are substantially identical with that of the preferred form described above, and are indicated by like reference numerals. In this case, however, the radiator 80' is disposed in front of the engine while the operator's seat 95 is mounted behind the engine on a standard 96', which is fixed to the top of the transmission housing 13. The fan 85' is disposed behind the radiator 80' and is directly attached to its drive pulley 90', to which the belt 91 is connected.

The front side 98' of the water compartment 83' is inclined downwardly and forwardly in order that it is depressed below a plane beneath the operator's line of vision, indicated by a broken line A—C in Figure 8, of the ground between the arms 116 of the Y-shaped foretruck. This affords the operator a clear and unobstructed view of the cultivator tools during cultivating operation. Obviously, he also has a clear view of any tillage tools which might be mounted on the tractor as shown in Figure 7.

A steering shaft extension 128' is mounted in bearings 195 above the fuel tank 110', and is connected to the steering shaft 128 by a universal joint 196. This positions the steering wheel 129 in front of the seat 95 but maintains the shafts below the operators' line of vision A—C.

It will now be clear to those skilled in the art that the tractor shown and described herein has distinct advantages as a one-row tractor. The operator has full and complete vision of the cultivator shovels, directly in front of him without any obstruction to his line of vision, and by virtue of the position of the cultivators relative to the front wheels, the guiding of the cultivators along a plant row is facilitated. Furthermore, the tractor provides complete and unobstructed vision of a plow or other tillage tool behind the tractor and therefore the latter is admirably suited to general purpose duty. As indicated in Figure 6, a suitable drawbar 198 can be provided for towing combines and other towed implements behind the tractor.

I claim:

1. A general purpose tractor for plowing and for cultivating a single row of crops comprising, in combination, a narrow longitudinally extending body including an engine disposed longitudinally adjacent the rear end thereof, a pair of drive axle housings extending laterally from opposite sides of said body at the rear of the latter, a pair of vertically disposed drive gear housings depending from the outer ends of said axle housings, respectively, supporting axles projecting outwardly from said gear housings spaced below the axis of said drive housings, wheels mounted on said axles and adapted to straddle a single crop row, a pair of dirigible front wheels mounted on said body in longitudinal alignment with said rear wheels, respectively, an operator's seat mounted on said tractor intermediate said front and rear wheels ahead of said engine and at an elevation sufficient to provide an operator seated on said seat with a clear view not only of cultivating tools at the forward end of the tractor between the front wheels, but also of a tillage tool mounted on the tractor and trailing directly behind said rear wheels and between the latter.

2. A general purpose tractor for plowing and for cultivating a single row of crops comprising, in combination, a narrow longitudinally extending frame, a longitudinally extending engine rigidly mounted adjacent the rear end thereof, a transmission housing rigidly connected to the rear end of said engine and extending rearwardly from the latter to form a unitary frame structure, a pair of drive axle housings extending laterally in opposite directions, respectively, from said transmission housing at the rear end thereof, a pair of final drive housings depending from the outer ends of said axle housings, respectively, a pair of rear traction wheels having axles journaled in the lower portions of said final drive housings, respectively, and adapted to straddle a single row of plants and support said body in elevated position to clear the latter, a pair of dirigible front wheels mounted on said frame in longitudinal alignment with said rear wheels, respectively, an operator's seat mounted on said tractor ahead of said engine and above the latter, and a radiator for said engine disposed behind the latter and above said transmission housing and being shaped in contour to provide an operator seated on said seat with a clear view behind him of a tillage tool trailing directly behind the tractor and between the planes of said rear wheels.

3. A general purpose tractor for plowing and for cultivating a single row of crops comprising, in combination, a longitudinally extending body comprising a pair of longitudinally extending laterally spaced members, a longitudinally extending engine rigidly fixed between the rear ends of said members and a transmission housing rigidly connected to the rear end of said engine and extending rearwardly from the latter to form a unitary frame structure, a pair of drive axle housings bolted to opposite sides of said transmission housing adjacent the rear end of the latter and extending laterally therefrom, said axle housings having depending final drive housings at their outer ends, respectively, and formed integrally therewith, a pair of rear traction wheels having axles journaled in the lower portions of said final drive housings, respectively, and adapted to straddle a single row of plants and support said body in elevated position to clear the latter, a pair of dirigible front wheels mounted on said frame in longitudinal alignment with said rear wheels, respectively, an operator's seat mounted on said tractor ahead of said engine and above the latter, a fuel tank for said engine disposed behind said seat over the engine, and a radiator for the latter disposed behind said fuel tank over said transmission housing and having a downwardly and rearwardly sloping rear wall providing a clear view of the ground behind the tractor along a line from the operator's eye over the rear of said axle and transmission housings when the operator is seated in said seat and looking backwardly.

4. A general purpose tractor for plowing and for cultivating a single row of crops comprising, in combination, a longitudinally extending body comprising a pair of longitudinally extending laterally spaced members, a longitudinally extending engine rigidly fixed between the rear ends of said members and a transmission housing rigidly connected to the rear end of said engine and extending rearwardly from the latter to form a unitary frame structure, a pair of drive axle housings bolted to opposite sides of said transmission housing adjacent the rear end of the latter and extending laterally therefrom, said axle housings having depending final drive housings at their outer ends, respectively, and formed integrally therewith, a pair of rear traction wheels having axles journaled in the lower portions of said final drive housings, respectively, and adapted to straddle a single row of plants and support said body in elevated position to clear the latter, a pair of dirigible front wheels mounted on said frame in longitudinal alignment with said rear wheels, respectively, an operator's seat mounted on said tractor ahead of said engine and above the latter, a fuel tank for said engine disposed behind said seat over the engine, a radiator for the latter disposed behind said fuel tank over said transmission housing, a fan disposed in front of said radiator and arranged to force air rearwardly therethrough, a shaft on which said fan is mounted extending forwardly over said engine, bracket means carried on said engine in which said shaft is journaled, and a power transmitting belt connecting the forward end of said shaft with said engine.

5. In a tractor, a longitudinally disposed frame, an operator's station at the forward end of said frame, an engine mounted behind said operator's station near the rear end of said frame, a unitary transmission housing attached to said engine and extending rearwardly therefrom, said housing having partitions dividing the same into three compartments, clutch mechanism in the forward compartment adjacent said engine, a drive shaft extending from said clutch mechanism rearwardly into the second compartment, change speed gears disposed on said shaft in said second compartment, differential gear mechanism in the rear compartment, a shaft connecting said gears with said differential mechanism, a pair of laterally extending axle housings rigidly bolted to opposite sides of said unitary transmission housing adjacent the rear end thereof, drive axles disposed within said axle housings and connected with said differential mechanism, and a pair of rear traction wheels mounted on the outer ends of said axle housings and connected with said axles to be driven thereby, respectively.

6. In a tractor, a longitudinally disposed frame, a longitudinally disposed engine mounted adjacent the rear end thereof and having a main clutch at is rear end, a transmission housing fixed to the rear end of said engine and having a front portion enclosing said clutch and a top wall recessed downwardly and rearwardly from said front portion, a radiator for cooling said engine mounted behind the latter above said recessed portion of said transmission housing, an operator's seat mounted over the forward end of said engine, and a fuel tank mounted over said engine between said radiator and said seat.

7. In a tractor, a longitudinally disposed frame, a longitudinally disposed engine mounted adjacent the rear end thereof, a transmission housing fixed to the rear end of said engine, a pair of axle housings extending laterally at opposite sides of said transmission housing, an operator's seat mounted over the forward end of said engine, and a radiator for cooling said engine mounted behind the latter above said transmission housing, the upper portion of said radiator being inclined rearwardly and downwardly to lie beneath a plane of vision from the eye of an operator seated on said seat and the top of said axle housings to provide a clear view over said radiator and said axle housing of a tillage tool behind the tractor.

8. In a tractor, a longitudinally disposed frame, a longitudinally disposed engine mounted adjacent the rear end thereof, a transmission housing fixed to the rear end of said engine, a pair of axle housings extending laterally at opposite sides of said transmission housing, an operator's seat mounted on the forward end of said engine and overhanging the latter, a radiator for cooling said engine mounted behind the latter above said transmission housing, the upper portion of said radiator being inclined rearwardly and downwardly to lie beneath a plane of vision from the eye of an operator seated on said seat to the top of said axle housings to provide a clear view over said radiator and said axle housing of a tillage tool behind the tractor, and a fuel tank mounted over said engine between said seat and said radiator, the forward side of said tank being inclined downwardly and forwardly to provide clearance for said seat.

9. A general purpose tractor for plowing and for cultivating a single row of crops comprising, in combination, a longitudinally extending body comprising a pair of longitudinally extending, laterally spaced frame members, a longitudinally extending engine rigidly fixed between the rear ends of said members and a transmission housing rigidly connected to the rear end of said engine and extending rearwardly from the latter to form a unitary frame structure, a pair of drive axle housings bolted to opposite sides of said transmission housing adjacent the rear end of the latter and extending laterally therefrom, a pair of rear traction wheels mounted at the ends of said axle housings, respectively, and adapted to straddle a single row of plants, a pair of dirigible front wheels mounted on said frame in longitudinal alignment with said rear wheels, respectively, a radiator mounted at one end of said engine and having a water compartment at the upper end, an operator's seat mounted on said frame structure adjacent the opposite end of said engine in raised position so that an operator is afforded a clear and unobstructed view of the ground between the front wheels during cutivating and behind the tractor between said rear traction wheels during plowing, said water compartment having its wall on the side opposite said seat inclined along a plane beneath the line of vision of the operator in that direction.

10. A general purpose tractor for plowing and for cultivating a single row of crops comprising, in combination, a longitudinally extending body comprising a pair of longitudinally extending, laterally spaced frame members, a longitudinally extending engine rigidly fixed between the rear ends of said members and a transmission housing rigidly connected to the rear end of said engine and extending rearwardly from the latter to form a unitary frame structure, a pair of drive axle housing bolted to opposite sides of said transmission housing adjacent the rear end of the latter and extending laterally therefrom, said axle housings having depending final drive housings at their outer ends, respectively, and formed integrally therewith, a pair of rear traction wheels having axles journaled in the lower portions of said final drive housings, respectively, and adapted to straddle a single row of plants under the center line of the tractor and support the body in elevated position to clear the latter, a Y-shaped front axle member having a central bearing portion journaled in longitudinally spaced bearings carried on said pair of frame members and rockable about a fore and aft extending axis and a pair of forwardly diverging supporting arms, a pair of dirigible front wheels mounted at the ends of said arms, respectively, a radiator mounted at one end of said engine and having a water compartment at the upper end, an operator's seat mounted on said frame structure adjacent the opposite end of said engine in raised position so that an operator is afforded a clear and unobstructed view of the ground between said forwardly diverging wheel supporting arms during cultivating and the like and behind the tractor between said rear traction wheels during plowing, and a fuel tank disposed above said engine between said seat and said water compartment, said water compartment and said fuel tank being depressed beneath the line of vision of the operator in that direction.

11. A general purpose tractor for plowing and for cultivating a single row of crops comprising, in combination, a longitudinally extending body comprising a pair of longitudinally extending, laterally spaced frame members, a longitud'nally extending engine rigidly fixed between the rear ends of said members and a transmission housing rigidly connected to the rear end of said engine and extending rearwardly from the latter to form a unitary frame structure, a pair of drive axle housings bolted to opposite sides of said transmission housing adjacent the rear end of the latter and extending laterally therefrom, a pair of rear traction wheels mounted at the ends of said axle housings, respectively, and adapted to straddle a single row of plants, a pair of dirigible front wheels mounted on said frame in longitudinal alignment with said rear wheels, respectively, a radiator mounted at the forward end of said engine and having a water compartment at the upper end, an operator's seat mounted behind said engine in raised position, said water compartment having its front wall inclined along a plane beneath the line of vision of an operator, seated on said seat, to the ground between said front wheels, whereby said operator is afforded a clear and unobstructed view of the plants being cultivated.

12. A general purpose tractor for plowing and for cultivating a single row of crops comprising, in combination, a longitudinally extending body comprising a pair of longitudinally extending, laterally spaced frame members, a longitudinally extending engine rigidly fixed between the rear ends of said members and a transmission housing rigidly connected to the rear end of said engine and extending rearwardly from the latter to form a unitary frame structure, a pair of drive axle housings bolted to opposite sides of said transmission housing adjacent the rear end of the latter and extending laterally therefrom, said axle housings having depending final drive housings at their outer ends, respectively, and formed integrally therewith, a pair of rear traction wheels having axles journaled in the lower portions of said final drive housings, respectively, and adapted to straddle a single row of plants under the center line of the tractor and support the body in elevated position to clear the latter, a Y-shaped front axle member having a central bearing portion journaled in longitudinally spaced bearings carried on said pair of frame members and rockable about a fore and aft extending axis and a pair of forwardly diverging supporting arms, a pair of dirigible front wheels mounted at the ends of said arms, respectively, a radiator mounted at the forward end of said engine and having a water compartment at the upper end, an operator's seat, mounted behind said engine in raised position, said water compartment having its front wall inclined along a plane beneath the line of vision of an operator, seated on said seat, to the ground between said forwardly diverging wheel supporting arms during cultivating, whereby said operator is afforded a clear and unobstructed view of the plants being cultivated, and a fuel tank disposed above said engine between said seat and said water compartment and depressed beneath said line of vision.

13. An agricultural tractor for plowing and for cultivating a single row of crops comprising, in combination, a longitudinally extending body including an engine spaced appreciably rearwardly from the forward end thereof, a pair of drive axle housings extending laterally from opposite sides of said body at the rear of the latter, a pair of vertically disposed drive gear housings depending from the outer ends of said axle housings, respectively, supporting axles journaled in said gear housings below said drive housings, wheels mounted on said axles and adapted to straddle a single crop row, a pair of dirigible front wheels mounted on said body in longitudinal alignment with said rear wheels, respectively, an operator's station at the front end of said body including a seat disposed ahead of said engine and above the latter at an elevation sufficient to provide an operator seated on said seat with a clear view not only of cultivating tools at the forward end of the tractor between the front wheels, but also a clear view rearwardly over said engine and body of a tillage tool mounted on the tractor and trailing closely behind said axle housings and between said rear wheels.

14. In a tractor, a longitudinally disposed frame, a longitudinally disposed engine mounted adjacent the rear end thereof and having a flywheel at its rear end and a clutch associated with said flywheel, a power shaft extending rearwardly from said clutch coaxial with said flywheel, transmission gears on said shaft behind said clutch, said gears being appreciably smaller in diameter than said flywheel and clutch, a transmission housing enclosing said clutch and said gears, the top wall of said housing being inclined downwardly and rearwardly behind said clutch to an elevation over said gears appreciably below the top of said flywheel, a radiator for cooling said engine mounted behind said flywheel at the rear end of said inclined top wall with the bottom of said radiator appreciably below the top of said flywheel, a transverse axle housing mounted at the rear of said transmission housing, and an operator's seat mounted at the forward end of said engine at an elevation sufficient to provide the operator with an unobstructed view to the rear over said axle and transmission housings and radiator of a tillage tool trailing directly behind the tractor.

15. In a tractor, a longitudinally disposed frame, a longitudinally disposed engine mounted adjacent the rear end thereof and having a flywheel at its rear end and a clutch associated with said flywheel, a power shaft extending rearwardly from said clutch coaxial with said flywheel, transmission gears on said shaft behind said clutch, said gears being appreciably smaller in diameter than said flywheel and clutch, a transmission housing enclosing said clutch and said gears, the top wall of said housing being inclined downwardly and rearwardly behind said clutch to an elevation over said gears appreciably below the top of said flywheel, a radiator for cooling said engine mounted behind said flywheel at the rear end of said inclined top wall with the bottom of said radiator appreciably below the top of said flywheel, a transverse axle housing mounted at the rear of said transmission housing, and an operator's seat mounted over the forward end of said engine, said radiator having an upper portion inclined rearwardly and downwardly to lie beneath a plane of vision from the eye of an operator seated on said seat to the top of said axle housing to provide a clear view over said radiator and axle housing of a tillage tool behind the tractor.

16. In a tractor, a longitudinally disposed frame, a longitudinally disposed engine mounted adjacent the rear end thereof and having a flywheel at its rear end and a clutch associated with said flywheel, a power shaft extending rearwardly from said clutch coaxial with said flywheel, transmission gears on said shaft behind said clutch, said gears being appreciably smaller in diameter than said flywheel and clutch, a transmission housing enclosing said clutch and said gears, the top wall of said housing being inclined downwardly and rearwardly behind said clutch to an elevation over said gears appreciably below the top of said flywheel, a radiator for cooling said engine mounted behind said flywheel at the rear end of said inclined top wall with the bottom of said radiator appreciably below the top of said flywheel, a transverse axle housing mounted at the rear of said transmission housing and an operator's seat mounted over the forward end of said engine, said radiator having an upper portion inclined rearwardly and downwardly to lie beneath a plane of vision from the eye of an operator seated on said seat to the top of said axle housing to provide a clear view over said radiator and axle housing of a tillage tool behind the tractor, and a fuel tank mounted over said engine between said seat and said radiator, the forward side of said tank being inclined downwardly and forwardly to provide clearance for said seat.

17. A general purpose tractor for plowing and for cultivating a single row of crops comprising, in combination, a narrow longitudinally extending body including an engine disposed longitudinally adjacent the rear end thereof, a pair of drive axle housings extending laterally from opposite sides of said body at the rear of the latter, a pair of vertically disposed drive gear housings depending from the outer ends of said axle housings, respectively, supporting axles projecting outwardly from said gear housings spaced below the axis of said drive housings, wheels mounted on said axles and adapted to straddle a single crop row, a pair of arms extending forwardly from said body in laterally spaced relation to provide space therebetween for cultivating tools and the like, a pair of dirigible front wheels mounted at the forward ends of said arms in longitudinal alignment with said rear wheels, respectively, an operator's seat mounted on said tractor intermediate said front and rear wheels ahead of said engine and at an elevation sufficient to provide an operator seated on said seat with a clear view not only of cultivating tools at the forward end of the tractor between the front wheels, but also of a tillage tool mounted on the tractor and trailing directly behind said rear wheels and between the latter.

18. An agricultural tractor for plowing and for cultivating a single row of crops comprising, in combination, a longitudinally extending body including an engine spaced appreciably rearwardly from the forward end thereof, a pair of drive axle housings extending laterally from opposite sides of said body at the rear of the latter, a pair of vertically disposed drive gear housings depending from the outer ends of said axle housings, respectively, supporting axles journaled in said gear housings below said drive housings, wheels mounted on said axles and adapted to straddle a single crop row, a pair of arms extending forwardly from said body in laterally spaced relation to provide space therebetween for cultivating tools and the like, a pair of dirigible front wheels mounted at the forward ends of said arms in longitudinal alignment with said rear wheels, respectively, an operator's station at the front end of said body including a seat disposed ahead of said engine and above the latter at an elevation sufficient to provide an operator seated on said seat with a clear view not only of cultivating tools at the forward end of the tractor between the front wheels, but also a clear view rearwardly over said engine and body of a tillage tool mounted on the tractor and trailing closely behind said axle housings and between said rear wheels.

THEOPHILUS BROWN.